(12) United States Patent
Matsco et al.

(10) Patent No.: US 6,461,704 B1
(45) Date of Patent: Oct. 8, 2002

(54) MOLDED PLASTIC AUTOMOTIVE WINDOW PANEL AND PROCESS OF PROVIDING MASKING BORDER

(75) Inventors: Mark M. Matsco, South Lyon; Michael E. Sykes, Livonia; Roland Sauer, Wixom; Barry B. Hoult, Ann Arbor, all of MI (US)

(73) Assignee: Exatec, LLC., Wixom, MI (US)

( * ) Notice: Subject to any disclaimer, the term of this patent is extended or adjusted under 35 U.S.C. 154(b) by 0 days.

(21) Appl. No.: 09/691,622

(22) Filed: Oct. 18, 2000

Related U.S. Application Data

(60) Provisional application No. 60/160,113, filed on Oct. 18, 1999.

(51) Int. Cl.$^7$ .............................. B44C 5/08; B44F 1/06; B32B 17/00
(52) U.S. Cl. ........................... 428/38; 428/60; 428/192; 264/241; 264/252; 156/100; 156/304.5; 296/200
(58) Field of Search ............................... 428/14, 38, 57, 428/58, 60, 156, 161, 172, 192; 156/100, 242, 244.25, 301.1, 304.5; 264/241, 250, 252; 296/200, 201, 146.1

(56) References Cited

U.S. PATENT DOCUMENTS

| | | | | |
|---|---|---|---|---|
| 3,475,530 A | * | 10/1969 | Cooper | 264/246 |
| 3,922,456 A | * | 11/1975 | Baldridge | 428/203 |
| 4,316,868 A | * | 2/1982 | Esposito et al. | 425/462 |

* cited by examiner

Primary Examiner—Donald J. Loney
(74) Attorney, Agent, or Firm—John R. Benefiel

(57) ABSTRACT

A window panel for use in automotive glazing applications is described, in which inner planer piece transparent plastic is bonded to an outer piece molded from an opaque plastic creating a masking border. The two pieces have overlapping portions, and may be of reduced or tapering thickness to create a transition masking zone of reduced or varying opacity. The inner piece may be designed to separate from the outer piece at a lower impact force than that required to fracture the pieces to establish a prescribed failure mode. The window panel may be formed by a two shot molding process in which the inner and outer pieces are molded respectively to increase the overall window panel size beyond that able to be molded by a one shot process.

15 Claims, 2 Drawing Sheets

MOLDED PLASTIC AUTOMOTIVE WINDOW PANEL AND PROCESS OF PROVIDING MASKING BORDER

CROSS REFERENCE TO RELATED APPLICATION

This application claims the benefit of the filing date of provisional application No. 60/160,113, filed on Oct. 18, 1999.

BACKGROUND OF THE INVENTION

This invention concerns window panels for use in automotive glazing. In recent years, automobiles often have been equipped with window panels having an opaque black out masking border used to conceal constructional details, such as adhesive beads, etc. The black out border also adds an aesthetic accent, and has typically been created by black paint or imprinting applied to a window glass perimeter. The blackout border also functions to block UV radiation in sunlight needed to protect the adhesive used to fixed the window panel against the degrading effects of UV radiation.

A refinement of such masking border has been to add a transition "fade out" treatment to a solid black perimeter band, comprised of a region of gradually decreasing opacity, which improves the aesthetic appeal of a masking border having only solid black band.

The fade out region has been produced by imprinting a dot pattern of decreasing density adjacent the solid black band.

It has long been proposed to utilize hardcoated molded plastic panels as a substitute for the glass panels traditionally used in automotive glazing applications in order to reduce vehicle weight, to improve safety, and to enhance design flexibility in the shaping of the window panels.

The relatively large sizes of the molded plastic panels typically required for automotive glazing applications may be limited by the tonnage of the injection molding machine. That is, the area of the panel multiplied by the pressure required to inject the plastic (i.e., 2 tons per square inch) must not exceed the maximum tonnage limit of the machine, i.e., 750 tons. It would be advantageous to circumvent at least to some extent the size limitations imposed by the tonnage limit of the molding equipment.

Another desirable characteristic of an automotive window would be an ability to create an exit opening from within the passenger space by allowing an occupant to be able to force the window panel out without compromising the required minimum structural integrity of the window.

It is an object of the present invention to provide an improved process for creating a black out border treatment for molded plastic window panels with a fade out region adjacent a more completely opaque band extending around the perimeter of the panel.

It is another object of the present invention to provide a process for increasing the maximum size of an injection molded automotive window panel over that size which would otherwise be imposed by maximum tonnage limitations of the injection molding equipment used.

It is yet another object to provide a window panel which allows an exit opening to be formed by pushing out a section of the window while maintaining adequate structural integrity of the window panel.

SUMMARY OF THE INVENTION

The above recited objects as well as other objects which will be understood upon a reading of the following specification and claims are achieved by constructing a molded plastic window panel in two pieces, a rigid inner transparent panel piece and a rigid outer surrounding piece, each piece having a portion thereof overlapping a contiguous portion of the other piece. The outer piece and inner piece are each molded from a suitable plastic resin such as polycarbonate, the overlapping portions bonded together to form a unitary rigid window panel.

The inner piece is molded from a transparent resin and is configured to be fit within the outer piece which is molded from a plastic resin pigmented or otherwise having a material characteristic producing a maximum opacity. Alternative to black pigments, various colored additive materials can be used (which could be completely opaque, transparent or translucent) which can also produce special effects, i.e., textured, metallic flakes, etc.

The overlapping portion of the outer piece is of reduced thickness, so that the n overlap joint produces a band of reduced opacity, providing a transition to the maximum opacity outer band.

The overlapping portion of the outer piece is preferably tapered to be of decreasing thickness, creating a fade out transition region with a gradual lightening of the masking opacity. The overlapping portions can have many different configurations.

As an added feature, the overlapping portions are bonded so as to establish a controlled failure mode at a predetermined level of an outwardly directed force, enabling separation of the inner and outer pieces. The separation of the inner piece from the outer piece fixed to the vehicle body structure creates an opening which may be used for escape or extraction of the vehicle occupants, while being much more resistant to inwardly directed forces since abutting the fixed outer piece.

The inner and outer pieces can be molded in a two shot process, which by the combination of the two pieces allows manufacture of a complete window panel of a size greater than that able to be molded by a one shot process at the maximum allowable tonnage capacity of the injection machine.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
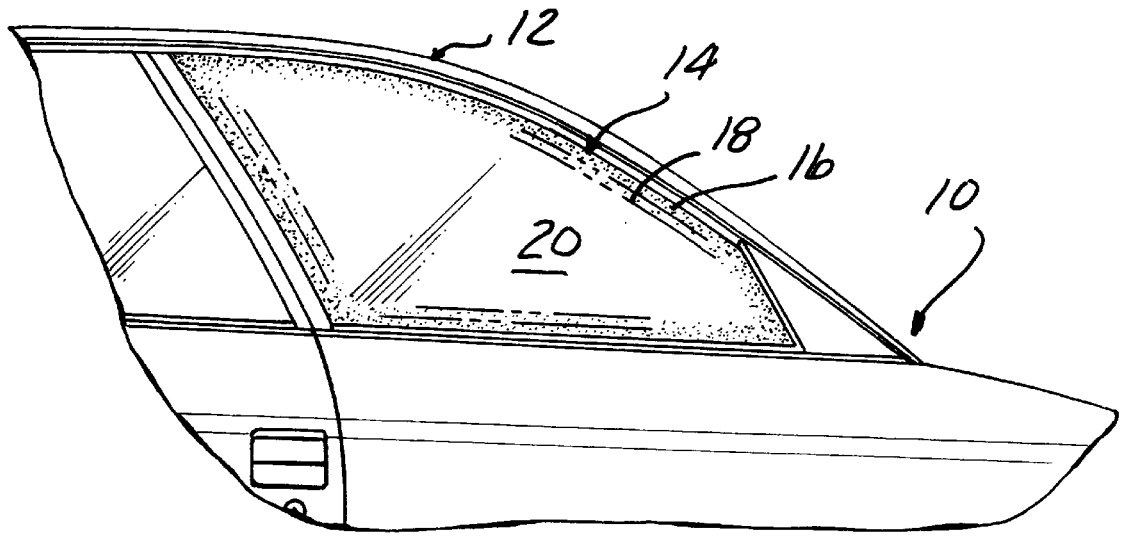
FIG. 1 is a fragmentary perspective view of an automotive vehicle and a molded plastic window panel according to the present invention installed therein.

Referring to FIG. 1, a fragmentary portion of an automotive vehicle 10 is depicted, having a rigid window panel 12 according to the invention installed therein.

The window panel 12 is shown as fixed in a window opening defined by the body structure of the vehicle 10, although flip out or drop window installations could also utilize the window panel 12 according to the present invention.

The window panel 12 has a masking border 14 extending about its outer perimeter, which comprises an outer band 16 of maximum opacity (i.e., about 5% light transmission) which blocks viewing of the structural details overlain by the outer band 16, and an inwardly disposed transition band 18 of decreased opacity. The central area 20 is of maximum transparency, although this area could also be tinted to have some slight degree of light absorption.

Figure 2:
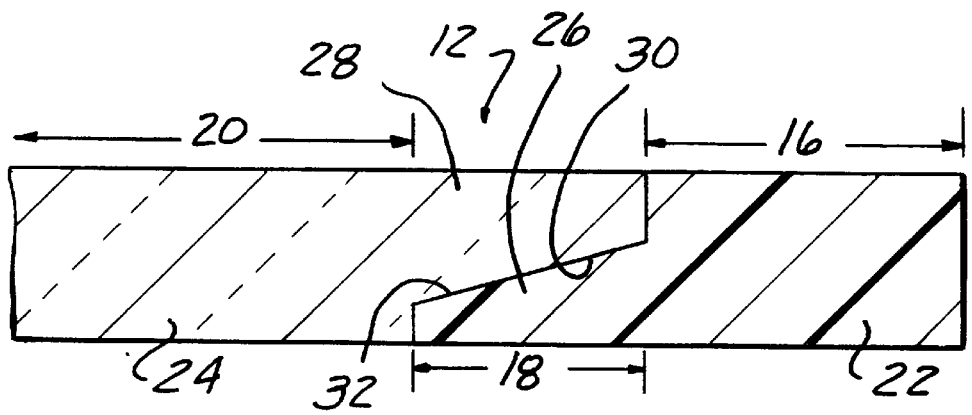
FIG. 2 is an enlarged sectional view of a border portion of the window panel shown in FIG. 1.

Figure 2 shows an outer region of the window panel 12 in enlarged section. The window panel 12 is constructed of two pieces, an outer surrounding piece 22 and a rigid, generally planar inner panel piece 24, each having a respective overlapping portion 26, 28. Outer piece 22 is molded from an opaque plastic material, i.e., a polycarbonate resin suitable for use an automotive glazing, which may contain an opaque tinting pigment (such as lamp black) to be at a maximum opacity, i.e., 5% light transmission, at the outermost band 16 thereof. Other materials can be used such a colored pigments, metallic flake fillers, etc.

The inner panel piece 24 is also molded from a compatible clear plastic resin such as polycarbonate to establish the transparent area 22.

The overlapping portions 26, 28 are bonded together to form along their mutually contacting surfaces 30, 32, as by melt bonding or by use of a suitable adhesive. It is noted that if an adhesive were used, this would not require a UV blocking primer since the adhesive would be protected from UV by the coated polycarbonate material).

The melt bond can be formed by a two shot molding process with a controlled degree of melt in to establish a desired bond strength.

The bonding of separately molded inner and outer pieces 24, 22 into a rigid unitary window panel 12 has the effect of producing a window panel 12 of increased the overall size over that which would be possible within the capacity of the injection molding equipment used. That is, the inner piece 24 can be at or below the maximum size allowed, with outer piece 22, the outer piece 22 also of a size molded in the second shot at or below the maximum size allowed. The combination of the two pieces 22, 24 yields a window panel 12 of a much larger size than could be injected molded of one piece.

As will be understood by those skilled in the art, the molded plastic window panel 12 normally will have one or more coatings applied to increase hardness and scratch resistance, and for other purposes as well known in the art.

The overlapping portions 26, 28 are complementarily tapered in thickness in the embodiment shown in FIG. 2. This yields a gradually changing opacity in the transition fade out band 18 due to the decreasing thickness of the portion 26 constructed of the maximum opacity material. Band 18 is provided to improve the aesthetic appeal of the masking border, and could have a considerable width range, i.e., ⅛" to ½" in width.

Figure 2A:
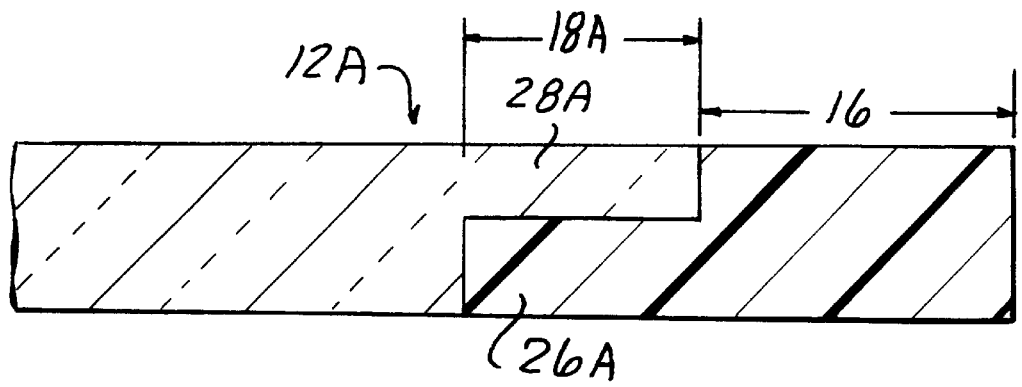
FIGS. 2A–2E are enlarged sectional views of various differing configurations of the window panel construction according to the invention.

FIG. 2A shows an alternate embodiment of the window panel 12A in which the overlapping portions 26A and 28A are not tapered so that the opacity in the transition fade out band 18A does not vary across its width but is reduced from that of the border 16.

In this embodiment, the overlapping portions 26A, 28A are of complementarily reduced thickness so that the window panel 12A is of a substantially uniform thickness, which is also the case in the embodiment shown in FIG. 2.

Figure 2B:
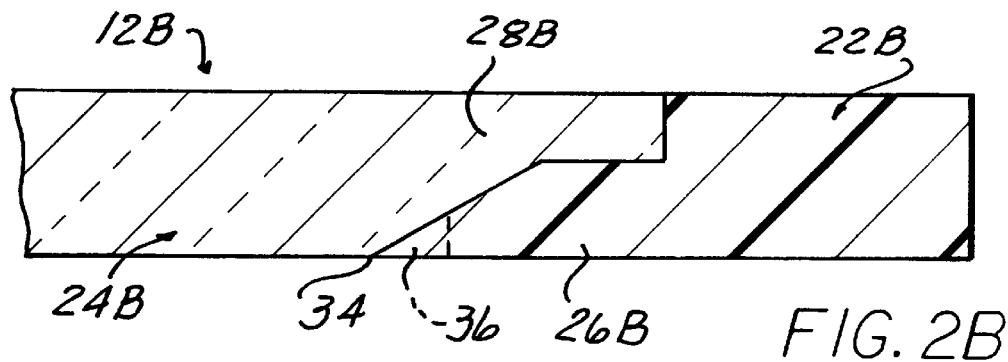

FIG. 2B shows another embodiment of the window panel 12B in which a knife edge 34 is created by machining a cavity 36 in the mold tooling.

Figure 2C:
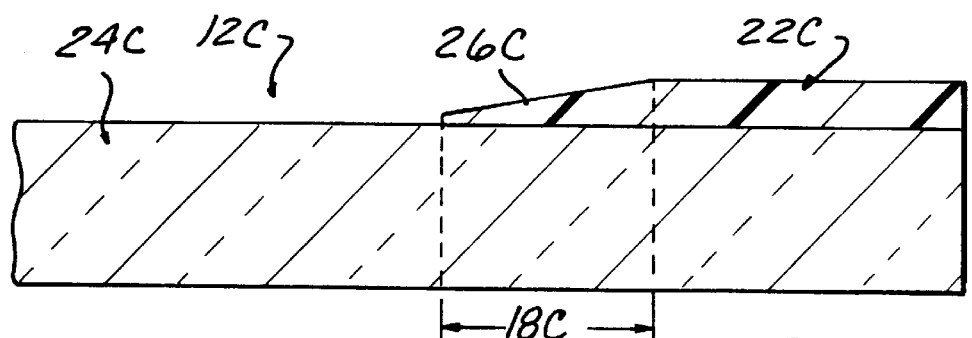

FIG. 2C shows an embodiment of the window panel 12C in which the outer piece 22C overlies the inner piece 24C, but has a tapering thickness portion 26C to create a transition fade out band 18C.

Figure 2D:
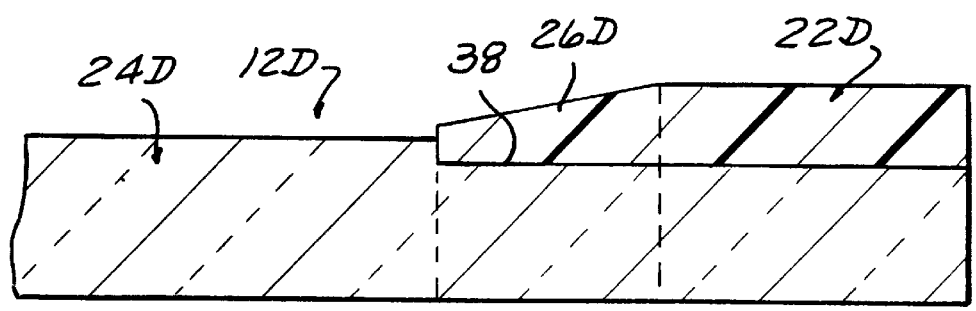

FIG. 2D shows an embodiment of the window panel 12D in which the outer piece 22D is received in a recess 38 in the inner piece 24D.

Figure 2E:
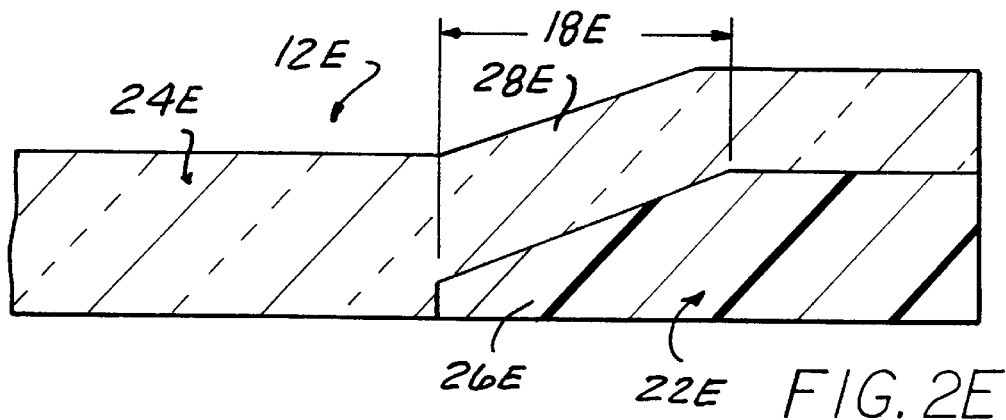

FIG. 2E shows an embodiment of the window panel 12E, in which the inner piece 24E has an overlapping portion 28E which is offset and recessed to overlap the outer piece 22E which has a tapering portion 26E to create the transition fade out band 18E of gradually reduced opacity.

The inner piece 24 and outer piece 22 in each case are overlapped, with the contacting surfaces bonded together, as by melt bonding or by the use of an adhesive. The bond strength may be selected to create a controlled failure zone in the window panel, i.e., so that those pieces will separate prior to fracturing of the pieces 22, 24 themselves, to reduce the chances of sharp fragments being formed. Separation of the inner piece 24, as by pushing the piece 24 out by an occupant, will create an opening having an nonjagged edge which can be used for escape or extraction of the occupants, another advantage of this window panel construction.

The larger bottom overlapping portion 26 of the outer piece 22 is abutted by the portion 28 of the inner piece 24, to render the inner piece 24 much more resistant to separation caused by inwardly directed forces, insuring adequate overall structural integrity of the window panel 12.

Other details such as etched or molded in texturing of the transition band can be added. The installation details are not here included, as conventional installations can be employed with the window panel according to the invention.

What is claimed is:

1. In combination, a window panel and an automotive body window opening, said window panel fit into said opening and comprising:
   a generally planar rigid inner panel piece of molded transparent plastic;
   a rigid outer surrounding piece extending around said inner panel piece having at least a portion thereof overlapping an outer perimeter portion of said inner panel piece and bonded thereto;
   said outer surrounding piece also of molded plastic and having an opacity creating at least a partially opaque masking border around said transparent inner panel piece.

2. The combination according to claim 1 wherein said outer surrounding piece overlapping portion is at least partly of a tapering thickness to create a transition fade out band of decreasing opacity between a main portion of said inner panel piece and a main portion of said masking border.

3. The combination according to claim 1 wherein said overlapping inner panel piece portion and said outer surrounding piece portion are each of reduced thickness to create a uniform thickness of said window panel.

4. The combination according to claim 2 wherein said outer surrounding piece overlapping portion tapers to a knife edge.

5. The combination according to claim 1 wherein one of said overlapping inner panel piece and outer surrounding piece portions is at least partially recessed into the other of said overlapping portions.

6. The combination according to claim 1 wherein at least one of said overlapping portions is offset from a remaining part of either said inner piece or said outer piece.

7. The combination according to claim 1 wherein said inner panel piece and said outer surrounding piece are each constructed of polycarbonate.

8. The combination according to claim 1 wherein said overlapping portions are melt bonded together along mutually contacting surfaces.

9. The combination according to claim 1 wherein said overlapping portions are adhesive bonded together along mutually contacting surfaces.

10. The combination according to claim 1 wherein said overlapping portion of said outer surrounding piece is of reduced thickness to produce a transition zone of reduced opacity between said transparent main region of said inner panel piece and said masking border.

11. A method of constructing a window panel for installation in an automotive body window opening comprising the steps of:

molding an inner transparent generally planar rigid panel piece from a plastic resin; molding a rigid outer surrounding piece from a plastic resin, said outer piece configured to extend around said inner piece and having a portion at least partially overlapping an outer perimeter portion of said inner piece, said outer piece plastic resin of sufficient opacity to create a masking border around said inner transparent piece; and bonding said overlapping portions together to form a rigid unitary window panel.

12. The method according to claim 11 further including the step of reducing the thickness of said overlapping outer piece portion to create a transition fade out band of reduced opacity.

13. The method according to claim 12 further including the step of tapering said reduced thickness of said outer piece overlapping portion to create a gradually reducing opacity in said transition fade out band.

14. The method according to claim 11 wherein in said bonding step, a bonding strength is established less than a fracture strength of said inner piece and outer piece to create a failure mode in which failure of said bond separates said inner piece from said outer piece at a force level below that causing fracture of either of said inner or outer pieces.

15. The method according to claim 11 wherein said window panel is injection molded by a process in which said inner piece is of a size at or below a maximum size allowed by the injection molding machine used, and said outer piece increases the overall size of said window panel over said maximum size allowed.

* * * * *